United States Patent [19]
Panhausen

[11] Patent Number: 6,050,587
[45] Date of Patent: Apr. 18, 2000

[54] PULLING ARRANGEMENT HAVING A GUIDE ELEMENT

[75] Inventor: Willi Panhausen, Gangelt, Germany

[73] Assignee: Spanset Inter AG, Oetwil am See, Switzerland

[21] Appl. No.: 08/761,099

[22] Filed: Dec. 5, 1996

[30] Foreign Application Priority Data

Dec. 5, 1995 [DE] Germany ............... 295 19 223 U

[51] Int. Cl.⁷ .............................................. B60D 1/18
[52] U.S. Cl. ............................................ 280/480; 294/74
[58] Field of Search ................................ 280/477, 480, 280/482, 504; 24/129, 300, 265 EE; 294/74, 82.11; 267/74, 69

[56] References Cited

U.S. PATENT DOCUMENTS

| | | |
|---|---|---|
| 2,452,752 | 11/1948 | Hartranft . |
| 2,585,054 | 2/1952 | Stachura . |
| 3,133,725 | 5/1964 | Lanum . |
| 3,718,945 | 3/1973 | Brindejonc De Treglode ............ 24/73 |
| 3,860,226 | 1/1975 | Hensiek, Jr. ............................. 267/69 |
| 3,862,673 | 1/1975 | Benson . |
| 3,923,171 | 12/1975 | Pragnell et al. . |
| 4,699,394 | 10/1987 | Laie ....................................... 280/493 |
| 4,860,408 | 8/1989 | Johnson ............................... 24/68 CD |
| 5,072,964 | 12/1991 | Schule .................................... 280/457 |
| 5,238,279 | 8/1993 | Anteau . |
| 5,308,101 | 5/1994 | Monty . |

FOREIGN PATENT DOCUMENTS

| | | |
|---|---|---|
| 0 255 281 | 2/1988 | European Pat. Off. . |
| 80445 | 3/1963 | France . |
| 566 896 | 12/1932 | Germany . |
| 16 11 210 | 10/1948 | Germany . |
| 11 17 399 | 11/1961 | Germany . |
| 18 86 790 | 10/1963 | Germany . |
| 1 944 193 | 8/1966 | Germany . |
| 1 990 191 | 7/1968 | Germany . |
| 19 96 365 | 11/1968 | Germany . |
| 76 40 083 | 4/1977 | Germany . |
| 78 10 362 | 4/1978 | Germany . |
| 27 28 785 | 1/1979 | Germany . |
| 29 10 910 | 2/1980 | Germany . |
| 28 36 458 | 3/1980 | Germany . |
| 28 41 603 | 4/1980 | Germany . |
| 30 17 915 | 11/1981 | Germany . |
| 86 07 517 | 7/1986 | Germany . |
| 90 05 711 | 2/1991 | Germany . |
| 07041279 | 2/1995 | Japan . |
| 1 504 376 | 3/1978 | United Kingdom . |

*Primary Examiner*—Brian L. Johnson
*Assistant Examiner*—Avraham H. Lerner
*Attorney, Agent, or Firm*—Venable; Catherine M. Voorhees; Gabor J. Kelemen

[57] ABSTRACT

A pulling arrangement to be disposed between a traction device and an object to be pulled includes a pulling device and a guide element operatively coupled to the pulling device for guiding fragments thereof when the pulling device fails. Fastening devices are disposed on the guide element for fastening the same, independently of the pulling device, to connecting elements of the traction device and of the object to be pulled. The guide element further has a length which is expandable beyond a length of the pulling device when the pulling device fails at any portion thereof.

18 Claims, 8 Drawing Sheets

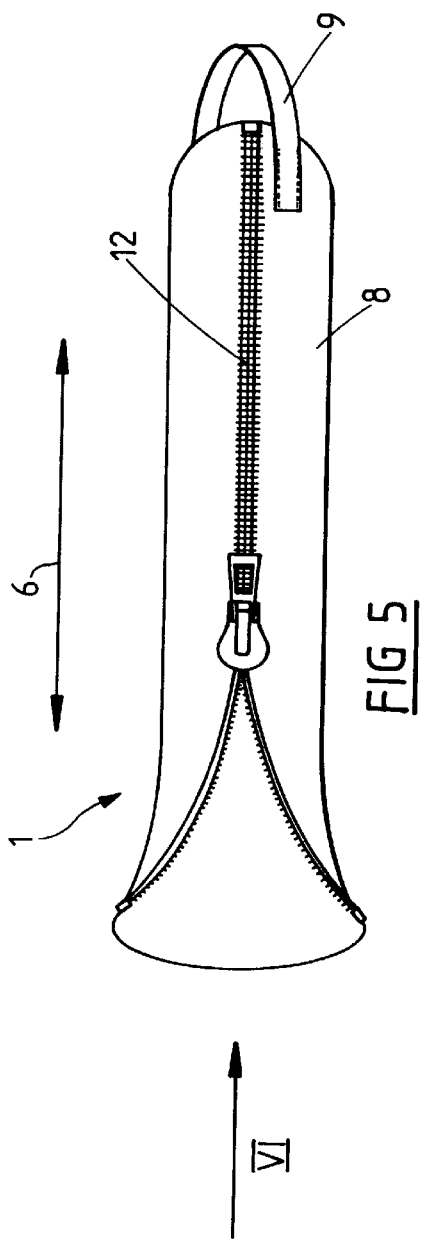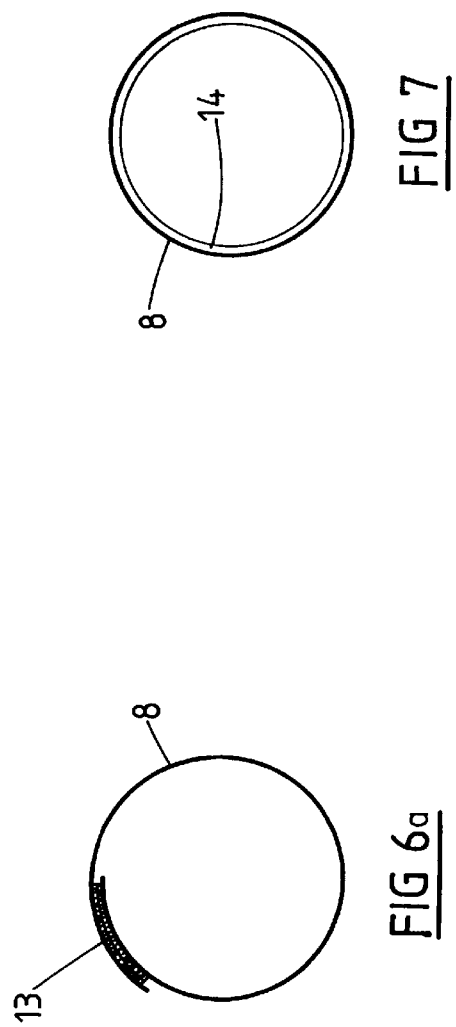

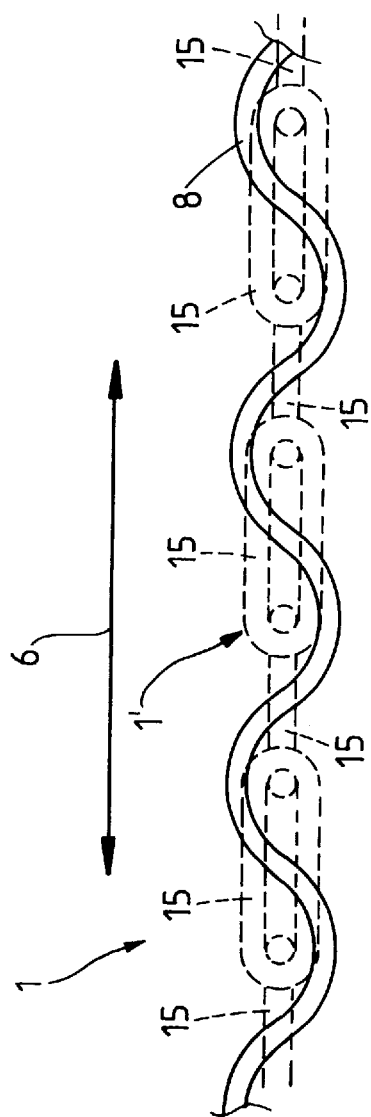
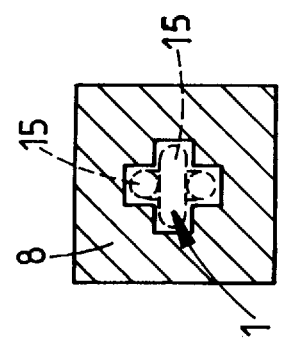
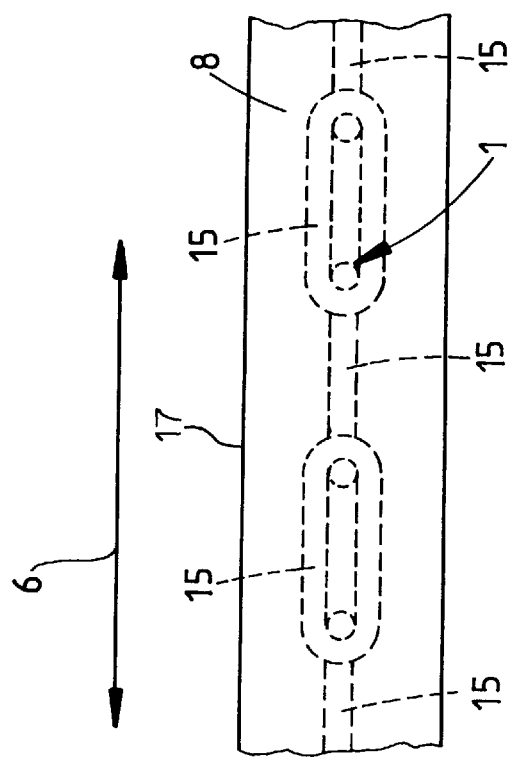

PULLING ARRANGEMENT HAVING A GUIDE ELEMENT

CROSS REFERENCE TO RELATED APPLICATION

This application claims the priority of German Application No. 295 19 223.2 filed Dec. 5, 1995, which is incorporated herein by reference.

FIELD OF THE INVENTION

The present invention relates to a pulling arrangement to be disposed between a traction device and an object to be pulled. The pulling arrangement includes a pulling device which may be configured in any known manner, such as, for example, as a rope, a chain, a textile belt or a round textile sling. The pulling arrangement further includes a guide element operatively coupled to the pulling device for guiding fragments thereof when the pulling device fails (i.e. breaks or is torn apart).

A pulling arrangement such as the one described above may be used both with a stationary traction device, such as a stationary traction engine for pulling a load to be displaced, and with a mobile traction device, such as a vehicle for pulling another vehicle coupled thereto.

BACKGROUND OF THE INVENTION

DE-78 10 362 discloses a tension spring for transmitting force between a garage wall and the associated garage door. The tension spring is disposed in a protective sleeve in order to minimize the risk of injury to persons and of damage to objects in the event the tension spring breaks. The protective sleeve includes a first pipe overlapping a second pipe, and is directly fastened on the tension spring proper. In the event the tension spring breaks at the center region thereof, the protective sleeve, because of its longitudinal displaceability, expands to a length greater than the length of the tension spring and effects an axial guidance of the breaking tension spring as a result of the mutual overlapping of the first and second pipes. However, if the tension spring breaks at its end regions, the shown protective sleeve can no longer function to effect an axial guidance of the breaking tension spring. Thus, in the event of the above, the tension spring is laterally deflected in an uncontrollable manner, and is likely to cause injury to persons or damage to property in spite of the presence of the protective sleeve.

SUMMARY OF THE INVENTION

It is an object of the invention to provide a pulling arrangement which reduces the risk of injury to persons or of damage to objects when the pulling device of the pulling arrangement fails.

The above object, together with other objects to become apparent as the description progresses, are accomplished according to the invention by an improvement in the pulling arrangement as previously described where fastening means are disposed on the guide element for fastening the same, independently of the pulling device, to connecting elements of the traction device and of the object to be pulled, and further where the guide element has a length which is expandable beyond a length of the pulling device when the pulling device fails at any portion thereof.

The length of the guide element may be made advantageously expandable either by configuring the guide element to have a greater length than the pulling device and by thereafter gathering the guide element at at least a portion thereof, or, alternatively, by using a resilient material to make the guide element, which may then be expanded reversibly or irreversibly to a length exceeding the length of the pulling device.

The independent fastening of the guide element to the connecting elements of the traction device and of the object to be pulled ensures a favorable, uniform guidance of the pulling device being torn apart regardless of the location of the breaking point or breaking points on the pulling device. Thus, the guide element according to the invention ensures a greater protection against risks of injury to persons or of damage to property than guide elements of the prior art. The guide element according to the invention advantageously guides any fragments of the pulling device being torn apart. The above guidance results in a controlled movement of the pulling device and of fragments thereof, and further in a reduction of any sudden stress energy associated with a failure of the pulling device regardless of the location of the breaking points on the pulling device. The above reduction in stress energy is brought about by virtue of the friction generated between the guide element and fragments of the pulling device sliding along the guide element.

According to one embodiment of the invention, the guide element comprises a protective sleeve surrounding the pulling device. In the above embodiment, the guide element is distinct from the pulling device. The fastening means may include fixing loops which allow the sleeve to be hooked to the connecting elements of the traction device and of the object to be pulled, thus fixing the protective sleeve with respect to the pulling device in a rest state of the protective sleeve (i.e. a state of the protective sleeve where the pulling device is not failing, that is, intact).

According to an alternative of the above embodiment, the protective sleeve, in its rest state, comprises pleats in at least a portion thereof, the length of the protective sleeve being expandable beyond the length of the pulling device in a failed state of the pulling device by virtue of an unfolding of the pleats. In order to achieve the above configuration, a continuous protective sleeve having an inherent (i.e. unpleated) length may be pleated such that its pleated length matches the length of the pulling device in a rest state of the protective sleeve. According to a further alternative, the protective sleeve may be made of a flexible, resiliently expandable material and is expandable beyond the length of the pulling device in a failed state of the pulling device by virtue of a longitudinal expansion of the resiliently expandable material. The resiliently expandable material may include a plastic material, or a woven or braided textile material.

The protective sleeve according to the above two alternatives, that is, alternatives involving use of a pleated protective sleeve on the one hand, and of a resiliently expandable sleeve on the other hand, forms a material reservoir for the pulling device which, following a failure of the pulling device, advantageously expands so that any fragments of the failed pulling device continue to be disposed inside the sleeve and are safely guided therein. In addition, the above two alternatives lead to a length expansion of the protective sleeve which is determinable in advance. Thus, in the event of a failure of the pulling device, a length expansion of the protective sleeve can be determined to be sufficient in size to accommodate the failed pulling device therein, thereby effectively preventing any additional tearing of the protective sleeve and ensuring the guiding properties of the protective sleeve in most instances.

According to a further embodiment of the invention, the protective sleeve includes two partial sleeves overlapping one another and longitudinally displaceable with respect to one another, each partial sleeve having an outer end. The fastening means in the above embodiment include a fixing loop disposed at the outer end of each partial sleeve for hooking each partial sleeve to a corresponding connecting element. The above embodiment is useful when mobile traction devices are used. In such cases, the traction engine cannot be prevented from quickly moving further away from the object to be pulled after the failure of the pulling device. The configuration of the protective sleeve as one comprising two partial sleeves effectively prevents a tearing apart of the protective sleeve when a mobile traction device is used. Moreover, by using two partial sleeves of identical size, the overlap of the partial sleeves can be dimensioned such that the partial sleeves overlap over their entire lengths, thus allowing the longest possible separation path of the partial sleeves with respect to one another. The above arrangement in turn assures that the guiding properties of the protective sleeve are maintained over a long time interval during the failure of the pulling device.

According to yet another embodiment of the invention, the protective sleeve includes means disposed thereon for longitudinally opening and closing the protective sleeve. The above configuration of the protective sleeve on the one hand facilitates the insertion of the pulling device into the protective sleeve, and, on the other hand, allows a fast removal of the protective sleeve from the pulling device, for example for service and inspection purposes. Finally, the above configuration facilitates a removal from the protective sleeve of a pulling device that has failed. The means for opening and closing may advantageously comprise a fastening device having mutually engageable teeth sold under the trademark ZIPPER, a fastening device having mutually engageable fibers sold under the trademark VELCRO, or belt means having a plurality of buckles and a plurality of straps fastenable to the buckles.

According to one embodiment of the invention, the guide element includes a protective layer, preferably made of a plastic material, covering the interior walls of the guide element. The above configuration prolongs the service life of the protective sleeve. Additionally, a protective sleeve coated in the above manner can withstand several incidents where the pulling device disposed therein fails, thus allowing the protective sleeve to be used repeatedly. As a result, the protective sleeve would only need to be discarded after a prolonged time interval, which would reduce the consumption of protective sleeves and lead to an environmentally friendly alternative in view of the reduced need for materials required to manufacture the sleeve.

According to another embodiment of the invention, the guide element comprises a protective cover cast from a plastic material. The above configuration results in a particularly sturdy guide element and in a particularly sturdy connection between the protective sleeve and the pulling means. Here, the pulling device may either be cast into the guide element, or be later pulled into the cast guide element.

According to one embodiment of the invention, the pulling device comprises a pulling chain and the guide element comprises a guide rope incorporated into the chain. The guide rope may be configured to be woven into the pulling chain and may comprise a steel cable or a textile rope. The guide rope may further be made of a resilient material. In this embodiment, the individual chain links may serve as form-fitting holding elements for the guide rope. The incorporation of the guide rope into the pulling chain results in a particularly good cohesion between the guide rope and the pulling device and thus promotes the guidance properties of the rope in the event of a failure of the pulling device. The woven course of the guide rope further guarantees the option of a longitudinal expansion of the guide rope in the event of a failure of the pulling device. Moreover, a resilient configuration of the guide rope allows an additional length expansion of the rope.

BRIEF DESCRIPTION OF THE DRAWINGS

The foregoing objects of the invention, together with other objects and advantages which may be attained by its use, will become more apparent upon reading the following detailed description of the invention taken in conjunction with the drawings. In the drawings, where like reference numerals identify corresponding components:

FIG. 5 is a perspective view of a part of a protective sleeve which can be opened longitudinally by means of a fastening device having mutually engageable teeth;

FIG. 6a is a cross-sectional view of a protective sleeve which may be opened longitudinally by means of a fastening device having mutually engageable fibers;

FIG. 7 is a cross-sectional view of a protective sleeve having a protective layer on the interior walls thereof;

FIG. 9 is a side elevational view of a pulling arrangement configured as a chain having a guide rope incorporated therein;

FIG. 10 is a side elevational view of a pulling arrangement configured as a chain having a protective cover thereon cast from a plastic material;

FIG. 11 is a cross sectional view of the pulling arrangement according to FIG. 10;

DETAILED DESCRIPTION OF THE INVENTION

Figure 1:
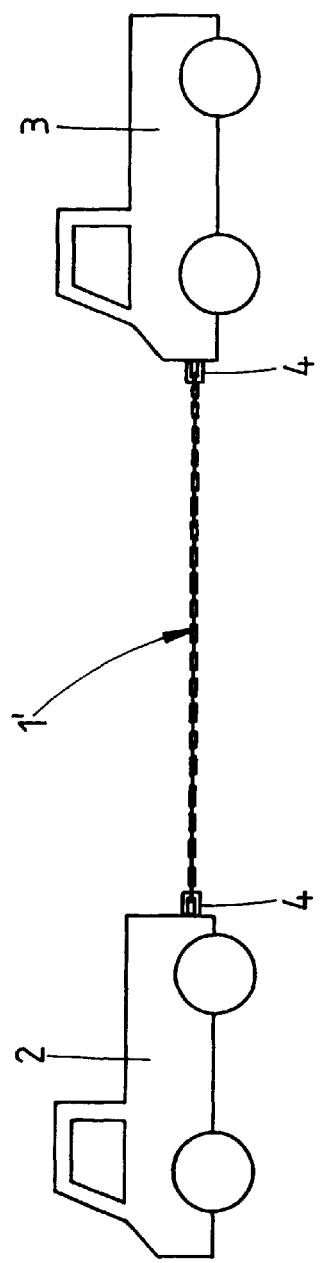
FIG. 1 is a side elevational view of a towing train including a traction engine towing a vehicle by means of a pulling arrangement.

Referring first to the embodiment shown in FIG. 1, a pulling arrangement 1 is disposed between a traction device comprising a traction engine 2 on the one hand, and an object to be pulled comprising a towed vehicle 3 on the other hand. The pulling arrangement includes a pulling device in the form of a pulling rope 1'. Connecting elements 4 to which the pulling rope is fastened are fitted on both traction engine 2 and vehicle 3.

Figure 2:
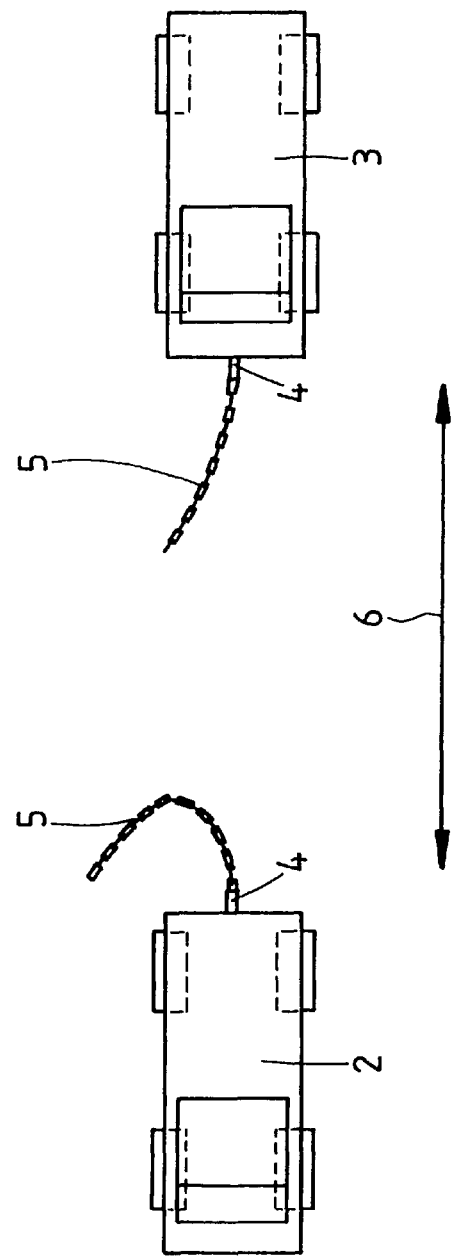
FIG. 2 is a top plan view of the towing train according to FIG. 1 schematically showing a failure of a pulling arrangement of the prior art.

FIG. 2 illustrates the breakage or pulling apart of a pulling device of the prior art. In FIG. 2, as a result of the breakage of the pulling device, portions 5 thereof are deflected in a direction other than longitudinal direction 6 of the shown pulling arrangement.

Figure 3:
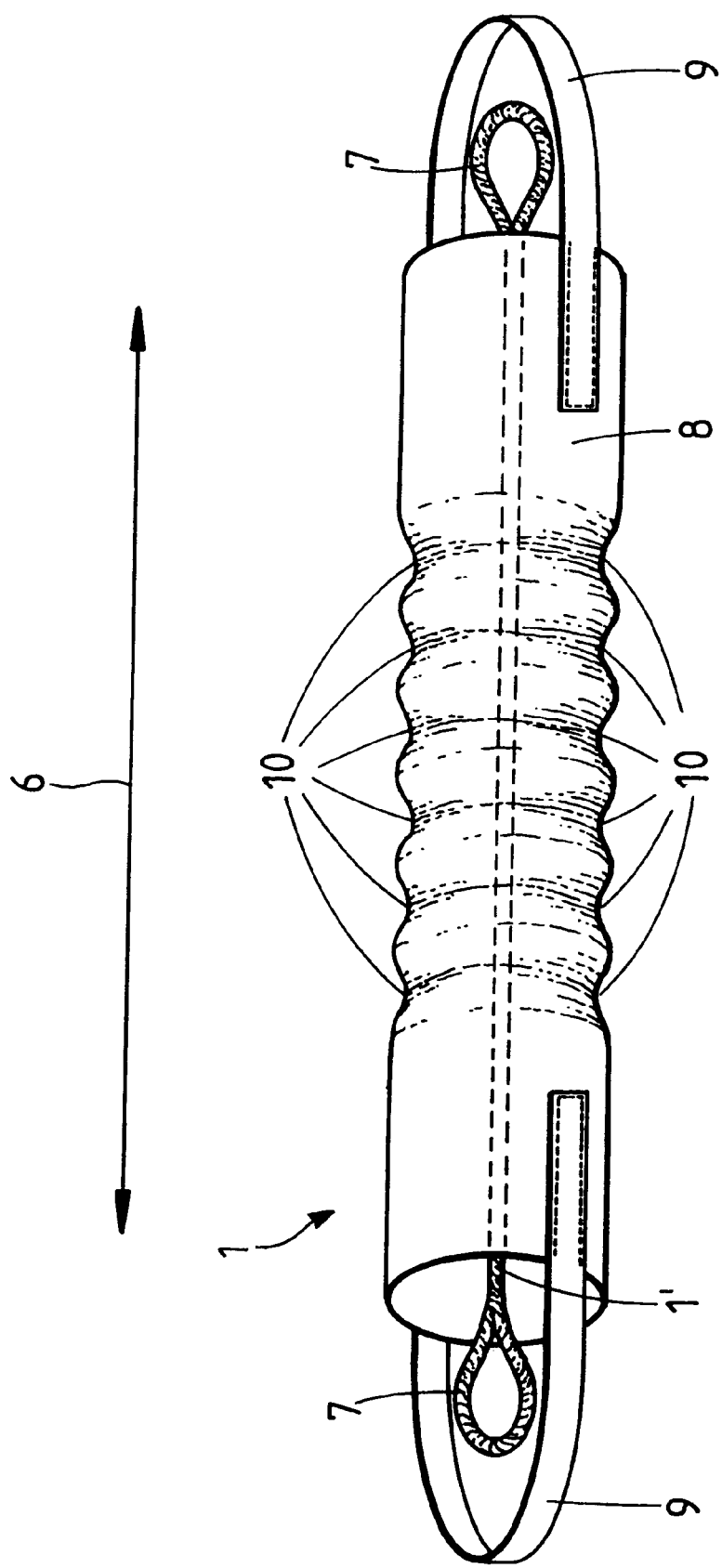
FIG. 3 is a perspective view of a pulling arrangement having a guide element configured as a gathered protective sleeve having pleats and including a pulling device therein.

Referring now to FIG. 3, pulling arrangement 1 according to the invention comprises a pulling rope 1' as its pulling device. The pulling rope includes fastening loops 7 at respective ends thereof which allow a connection of the pulling rope to connecting elements 4 (see FIG. 1). Moreover, a guide element 8 comprises a protective sleeve coupled to the pulling rope and having fixing loops 9 at respective ends thereof which allow a connection of the guide element to connecting elements 4 by hooking loops 9 onto the connecting elements. The above configuration of the pulling arrangement ensures that the guide element will remain securely fastened between the traction device and the object to be pulled over the entire length of the pulling device in the event of a failure thereof. In order to make possible length changes of the guide element in the event of a failure of the pulling device, guide element 8 shown in FIG. 3 is gathered (i.e. includes folds) at at least a portion thereof, for example by being pleated at the gathered portion with pleats 10. In the event of a failure of the pulling device, guide element 8 expands in the longitudinal direction 6 of the pulling arrangement by virtue of an unfolding of pleats 10, which leads to a smoothing out of the gathered portion of the guide element. The length of the guide element thus expands beyond the initial length of the pulling device 1.

Figure 4:
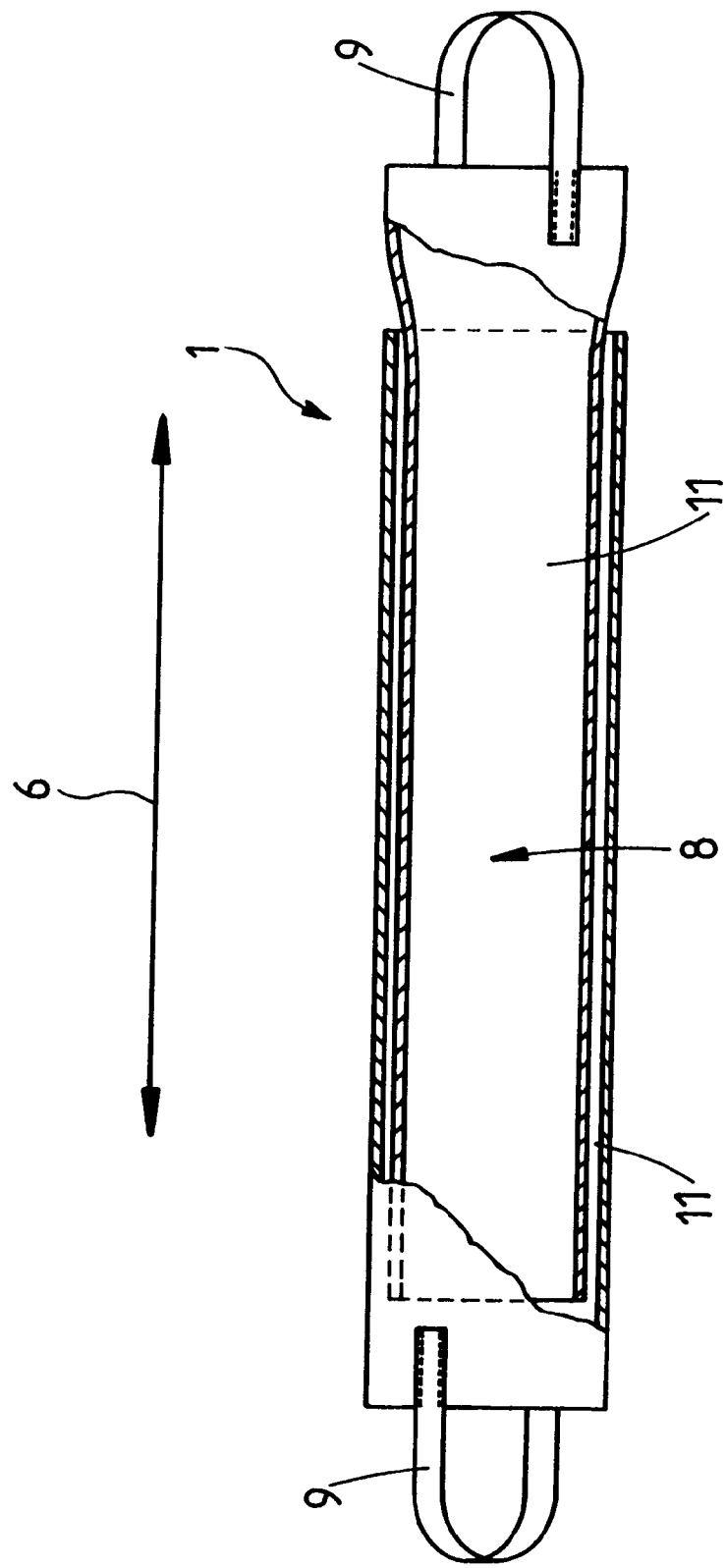
FIG. 4 is a longitudinal cross-sectional view of a two-piece protective sleeve as a guide element.

Referring to FIG. 4, another embodiment of guide element 8 is shown. In this embodiment, similar to the embodiment of FIG. 3, the guide element comprises a protective sleeve. However, in the instant embodiment, guide element 8 comprises two partial sleeves 11 which are longitudinally displaceable with respect to one another in the longitudinal direction 6 of the pulling arrangement. In a rest state of the guide element, partial sleeves 11 overlap one another almost entirely in longitudinal direction 6. In the event of a failure of the pulling device, partial sleeves 11 move away from one another in longitudinal direction 6. The above occurrence reduces the overlap region existing between partial sleeves 11 thus resulting in a length expansion of the entire guide element.

Referring to FIGS. 5 and 6, other embodiments of guide element 8 are shown. In the above three embodiments, similar to the embodiments of FIGS. 3 and 4, the guide element comprises a protective sleeve. However, in the embodiments of FIGS. 5 and 6, guide element 8 includes means for longitudinally opening and closing the same.

Figure 6B:
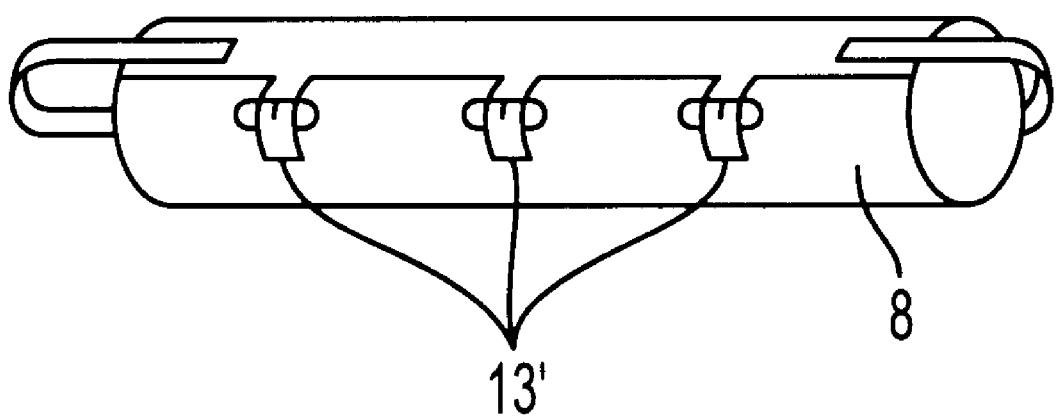
FIG. 6b is a perspective view of a protective sleeve which may be opened longitudinally by way of belt means.

As shown in FIG. 5, the means for longitudinally opening and closing may be a fastening device 12 having mutually engageable teeth, such as one sold under the trademark ZIPPER, extending in the longitudinal direction of the pulling arrangement. Alternatively, as shown in FIGS. 6a and 6b, the means for longitudinally opening and closing may be, respectively, a fastening means 13 having mutually engageable fibers, such as one sold under the trademark VELCRO or belt means 13' having a plurality of buckles and straps. In FIG. 6a, the fastening device sold under the trademark VELCRO is depicted in a cross sectional view of the guide element taken in a plane transverse to longitudinal direction 6 of the pulling arrangement.

Referring to FIG. 7, according to a further embodiment of the invention as shown in a cross sectional view of the guide element taken in a plane transverse to longitudinal direction 6, guide element 8 includes a protective layer 14 covering the interior walls thereof. Preferably, protective layer 14 is made of a plastic material.

Figure 8:
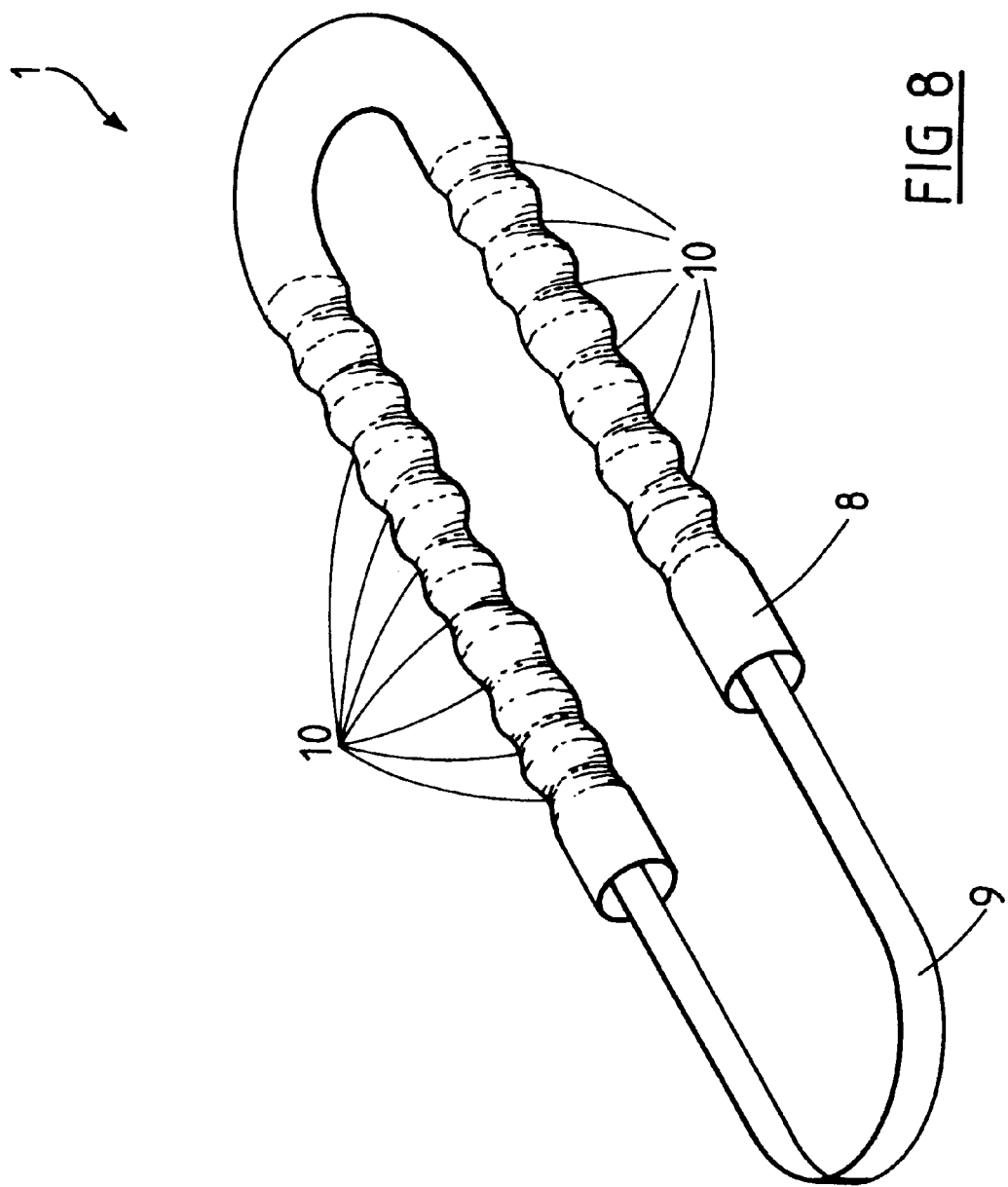
FIG. 8 is a perspective view of a pulling arrangement configured as a round sling where the protective sleeve is gathered at portions thereof.

FIG. 8 depicts a further embodiment of the invention where guide element 8 is a protective sleeve for round slings having a fixing loop 9. During the manufacture of round slings, the guide element is made from the outset as a separate element in the form of a protective sleeve. The design of the protective sleeve for use in the embodiment of FIG. 8 is similar to the design for the protective sleeve shown in the embodiment of FIG. 3. Thus, the protective sleeve of guide element 8 shown in FIG. 8, similar to the protective sleeve of FIG. 3, is gathered at at least a portion thereof, for example by being pleated at the gathered portion with pleats 10 as shown. In this manner, the guide element in the embodiment of FIG. 8 provides a reservoir which is variable in length.

In the embodiment of the invention shown in FIG. 9, pulling arrangement 1 includes a pulling device configured as a pulling chain 1' having a plurality of chain links 15. In the shown embodiment, guide element 8 comprises a guide rope integrated into the individual chain links by being woven into the links. As a result of the above, guide element 8 has a greater length than pulling device 1'.

In the embodiment of the invention depicted in FIG. 10, similar to the embodiment of FIG. 9, the pulling arrangement includes a pulling device configured as a pulling chain 1' having a plurality of chain links 15. The individual chain links 15 are embedded in a protective cover 17 cast from a plastic material and having a square cross section in a plane transverse to longitudinal direction 6 of the pulling arrangement. In the shown embodiment, protective cover 17 is cast from a plastic material and forms guide element 8.

Figure 12A:
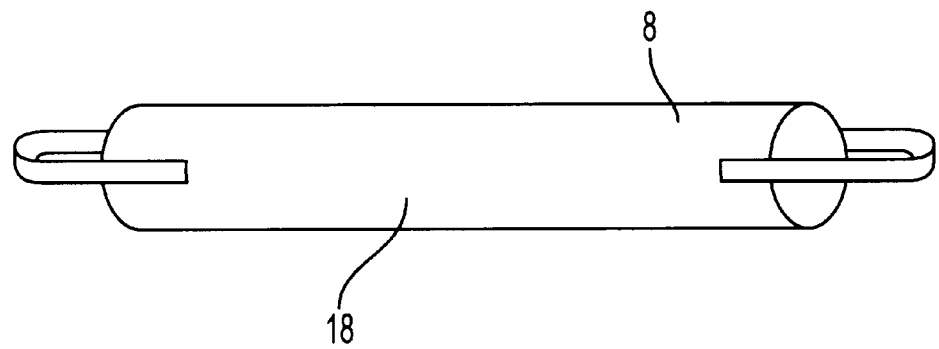
FIG. 12a is a perspective view of a protective sleeve made of a resilient plastic material.
Figure 12B:
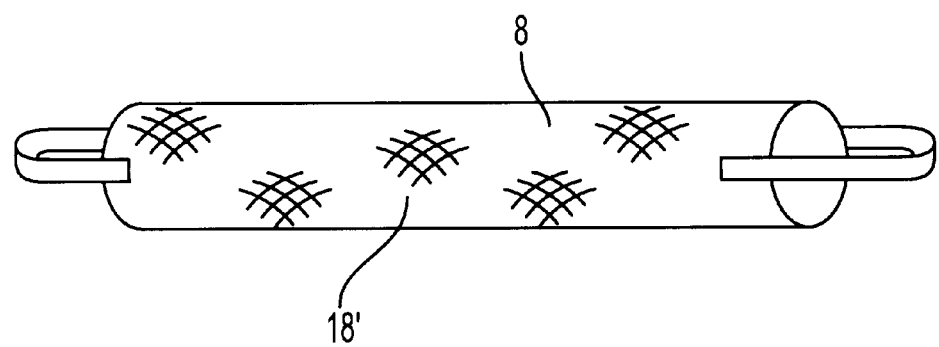
FIG. 12b is a view similar to FIG. 12a showing a protective sleeve made of a flexible, resiliently expandable woven or braided textile material.

Referring to FIGS. 12a and 12b, the protective sleeve may be made of a flexible, resiliently expandable material and is expandable beyond the length of the pulling device in a failed state of the pulling device by virtue of a longitudinal expansion of the resiliently expandable material. The resiliently expandable material may include a plastic material 18 as shown in FIG. 12a, or a woven or braided textile material 18' as shown in FIGS. 12b.

The operation of the pulling arrangement will now be described below.

In the event of a failure of pulling device 1', guide element 8 changes in length in longitudinal direction 6 of pulling arrangement such that the length of guide element 8 exceeds the length of pulling device 1 considerably. Guide element 8 guides the fragments 5 of the pulling device, which fragments are guided in longitudinal direction 6 of the pulling arrangement. The speed of fragments 5 is reduced as a result of the friction generated between guide element 8 and pulling device 1. Any sudden stress energy associated with a failure of the pulling device is likewise reduced by virtue of the reduction of the speed of fragments 5.

The invention now being fully described, it will be apparent to one of ordinary skill in the art that any changes and modifications can be made thereto without departing from the spirit or scope of the invention as set forth in the appended claims.

What is claimed is:

1. In a pulling arrangement positioned between a traction engine and a vehicle to be pulled, each of the traction engine and the vehicle to be pulled including at least one connecting element thereon, the pulling arrangement comprising:

a pulling device; and a guide element operatively coupled to the pulling device for guiding fragments thereof when the pulling device fails;

the improvement comprising fastening means disposed on the guide element for fastening the guide element, independently of the pulling device, to the at least one connecting elements of the traction engine and of the vehicle to be pulled, the guide element further having a length which is expandable beyond a length of the pulling device when the pulling device fails at any portion thereof.

2. The improvement according to claim 1, wherein the guide element comprises a protective sleeve surrounding the pulling device.

3. The improvement according to claim 2, wherein the fastening means comprise fixing loops for hooking the protective sleeve to the connecting elements.

4. The improvement according to claim 2, wherein:

the protective sleeve has a rest state; and in the rest state, the protective sleeve comprises pleats in at least a portion thereof, the length of the protective sleeve being expandable beyond the length of the pulling device in a failed state of the pulling device by virtue of an unfolding of the pleats.

5. The improvement according to claim 2, wherein the protective sleeve is made of a flexible, resiliently expandable material and is expandable beyond the length of the pulling device in a failed state of the pulling device by virtue of a longitudinal expansion of the resiliently expandable material.

6. The improvement according to claim 5, wherein the resiliently expandable material includes one of a plastic material and a textile material which is one of woven and braided.

7. The improvement according to claim 2, wherein:

the protective sleeve includes two partial sleeves overlapping one another and longitudinally displaceable with respect to one another, each partial sleeve having an outer end; and the fastening means include a fixing loop disposed at the outer end of each partial sleeve for hooking each partial sleeve to a corresponding connecting element.

8. The improvement according to claim 2, wherein the protective sleeve includes means disposed thereon for longitudinally opening and closing the protective sleeve.

9. The improvement according to claim 8, wherein the means for longitudinally opening and closing include one of:

a fastening means having a plurality of mutually engageable teeth;

a fastening means having a plurality of mutually engageable fibers; and belt means including a plurality of buckles and a plurality of straps fastenable to the buckles.

10. The improvement according to claim 1, wherein the guide element has interior walls and includes a protective layer covering the interior walls thereof.

11. The improvement according to claim 10, wherein the protective layer is made of a plastic material.

12. The improvement according to claim 11, wherein the guide element comprises a protective cover cast from a plastic material.

13. The improvement according to claim 1, wherein:

the pulling device comprises a pulling chain; and the guide element comprises a guide rope incorporated into the chain.

14. The improvement according to claim 13, wherein the guide rope is woven into the pulling chain.

15. The improvement according to claim 14, wherein the guide rope is one of a steel cable and a textile rope.

16. The improvement according to claim 13, wherein the guide rope is made of a resilient material.

17. A pulling arrangement positioned between a traction engine and a vehicle to be pulled, the pulling arrangement comprising:

a pulling device;

a guide element operatively coupled to the pulling device for guiding fragments thereof when the pulling device fails;

a first connecting element attached to the traction engine;

a second connecting element attached to the vehicle to be pulled by the traction engine; and fastening means disposed on the guide element for fastening the guide element, independently of the pulling device, to the first and second connecting elements, the guide element further having a length which is expandable beyond the length of the pulling device when the pulling device fails at any portion thereof.

18. A towing arrangement comprising:

a traction engine having a first end;

a vehicle having a second end to be towed by the traction engine; and a pulling arrangement, including:

a pulling device;

a guide element operatively coupled to the pulling device for guiding fragments thereof when the pulling device fails;

a first connecting element attached to the first end of the traction engine;

a second connecting element connected to the second end of the vehicle to be towed; and fastening means disposed on the guide element for fastening the guide element, independently of the pulling device, to the first and second connecting elements, the guide element further having a length which is expandable beyond the length of the pulling device when the pulling device fails at any portion thereof.

* * * * *